July 25, 1967 C. E. BECKER 3,332,363
DOUBLE CLOSURE HOPPER OUTLET ASSEMBLY
Filed Feb. 1, 1965 4 Sheets-Sheet 1
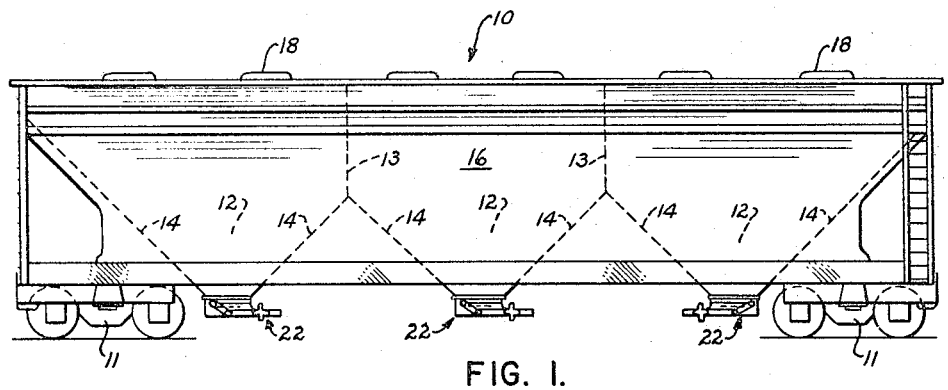
FIG. 1.
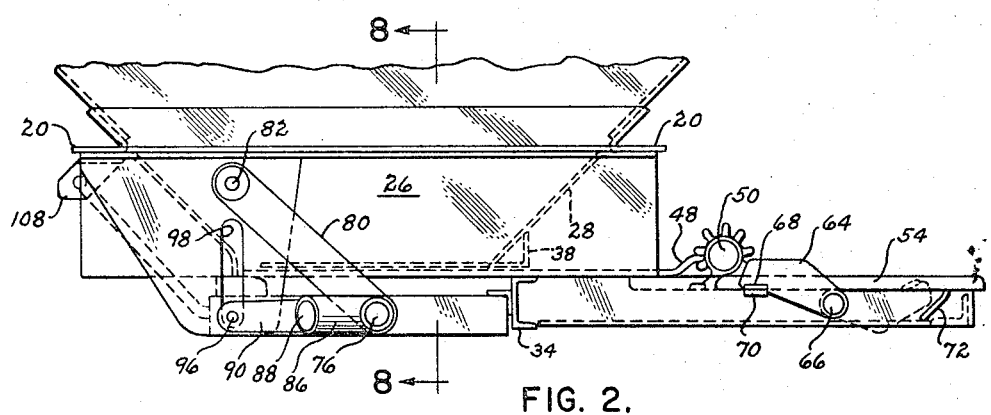
FIG. 2.
FIG. 3.
INVENTOR.
CARL E. BECKER
BY Eugene N. Riddle
ATTORNEY INVENTOR.
CARL E. BECKER
BY Eugene N. Riddle
ATTORNEY July 25, 1967  C. E. BECKER  3,332,363
DOUBLE CLOSURE HOPPER OUTLET ASSEMBLY
Filed Feb. 1, 1965  4 Sheets-Sheet 4

INVENTOR.
CARL E. BECKER
BY Eugene N. Riddle
ATTORNEY

United States Patent Office 3,332,363
Patented July 25, 1967

3,332,363
DOUBLE CLOSURE HOPPER OUTLET ASSEMBLY
Carl E. Becker, St. Louis, Mo., assignor to ACF Industries, Incorporated, New York, N.Y., a corporation of New Jersey
Filed Feb. 1, 1965, Ser. No. 429,475
3 Claims. (Cl. 105—280)

ABSTRACT OF THE DISCLOSURE

A bottom hopper outlet for a covered hopper railway car having a lower movable cover beneath a slidable gate, the cover being maintained with its upper surface generally level throughout its movement between open and closed positions. A rod extends transversely of the car with end portions of the rod extending beyond the ends of the cover to permit opening by rotation of the rod from either side of the railway car, and a toggle linkage is connected to the rod and rotatable therewith to releasably secure the cover in open and closed positions.

This invention relates to hopper structures and more particularly to a hopper outlet structure in which a movable cover is provided beneath a bottom discharge gate to protect the area beneath the gate from foreign matter and the like when the gate is closed.

In the transporting and unloading of finely-divided materials, and particularly food stuffs, such as flour, sugar and the like, it is necessary that no foreign matter or accumulation of moisture be permitted to contact and possibly contaminate the material from the area beneath the gate as the material is being unloaded. Normally, a circumferential housing or frame extends downwardly from the gate to define the discharge outlet so that a suitable discharge chute or the like may fit about the discharge outlet to receive the material when the gate is opened and the material is unloaded. If the interior of the housing beneath the gate is not covered or protected in some manner when the gate is closed, moisture or foreign matter, such as dust, clay, smoke and the like, may be deposited on the interior surface of the housing or the lower surface of the gate. Thus, upon subsequent unloading the deposited foreign matter will, at least to a certain extent, be entrained in the material being unloaded.

The hopper structure is unloaded by gravity and the cover is first moved to a stored position removed from beneath the movable gate. Then, the gate is opened to permit gravity discharge of the material from the hopper structure. The hopper outlet structure is particularly adaptable for use in a covered hopper railway car and is positioned generally centrally of the width of the railway hopper car with the lower cover being accessible from either side of the railway car. Thus, it is highly desirable to operate the cover from either side of the railway hopper car.

It is an object of the present invention to provide a hopper outlet structure in which a movable cover beneath the bottom discharge gate may be operated from opposite sides of the hopper structure.

An additional object of this invention is the provision of a railway hopper car having a plurality of hopper outlets arranged generally centrally of the width of the car, each outlet having a movable lower cover beneath a discharge gate which cover may be actuated from either side of the car to permit gravity discharge from the bottom discharge outlet.

A further object of this invention is the provision of such a movable cover for a hopper outlet structure beneath a discharge gate which cover may be releasably locked in a stored position to permit gravity discharge of material and releasably locked in a closed position beneath the discharge gate.

The present invention is directed to a hopper outlet structure having a movable gate regulating the flow of material through a bottom discharge outlet, and an elongate cover beneath the bottom discharge opening carried or supported on a rod extending the length of the cover and which may be rotated to move the cover between closed and open positions. A linkage is connected to the rod and suspends the rod and cover thereon beneath the discharge outlet. The linkage is adapted to releasably lock the lower cover in both open and closed positions and to guide the cover between open and closed positions with the cover remaining in a generally flat or level relation during movement between open and closed positions.

The invention accordingly comprises the constructions hereinafter described, the scope of the invention being indicated in the following claims.

In the accompanying drawings in which one of various possible embodiments of the invention is illustrated;

FIGURE 1 is a side elevation of the present invention illustrated in use on a covered hopper railway car;

FIGURE 2 is an enlarged fragment of FIGURE 1 illustrating the present invention in closed position beneath a movable gate of one of the hopper structures illustrated in FIGURE 1;

FIGURE 3 is a sectional view of the hopper structure shown in FIGURE 2 with the discharge gate and movable lower cover in closed position;

Corresponding reference characters indicate corresponding parts throughout the several views of the drawings.

Figure 4:
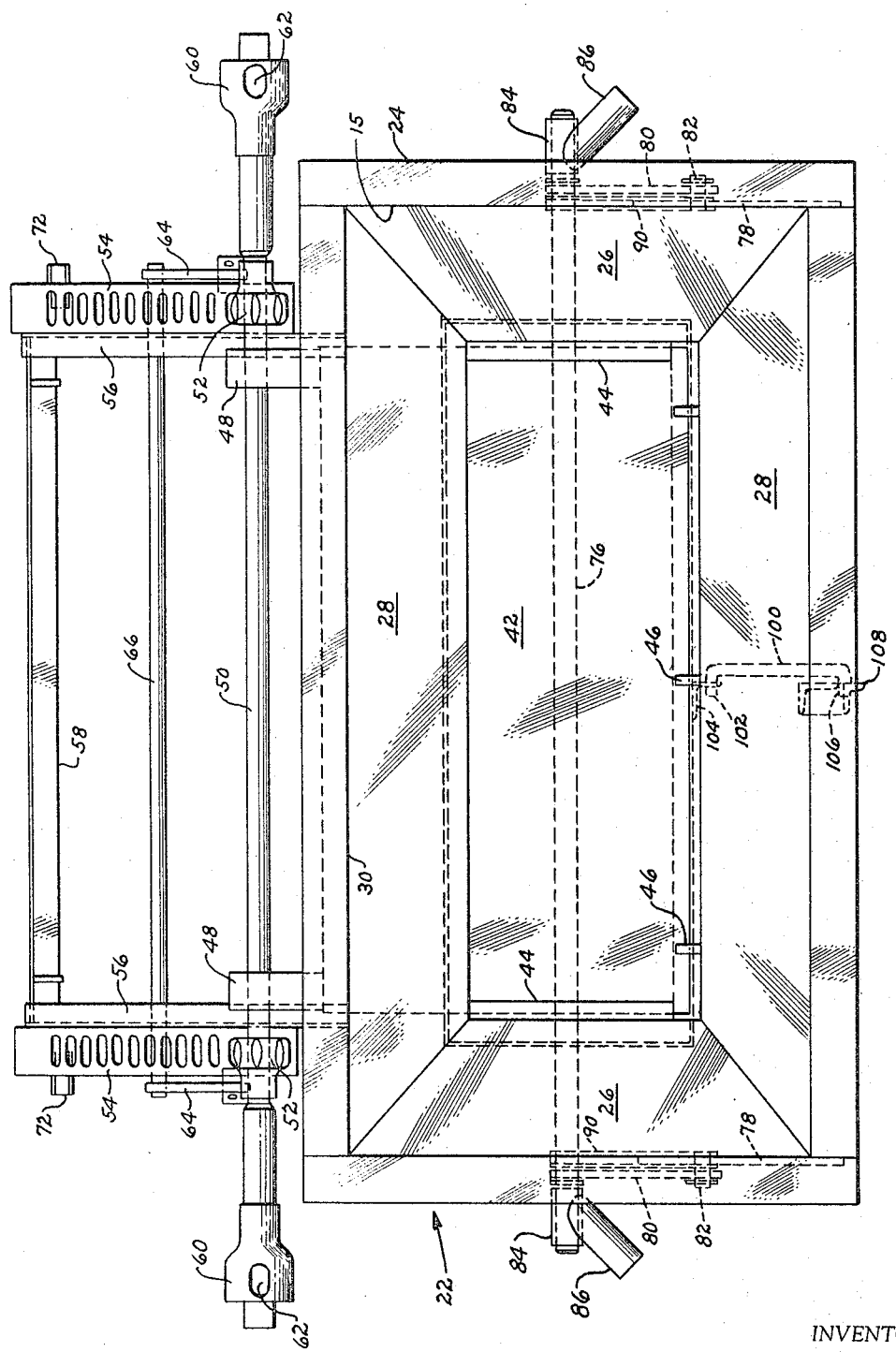
FIGURE 4 is a top plan view of the hopper structure of FIGURE 2 with the movable gate and cover in closed position.

Referring to the drawings for a better understanding of the invention and more particularly to FIGURE 1, a railway covered hopper car is designated generally 10 and has a truck assembly 11 adjacent each end. Car 10 has a plurality of hoppers 12 separated by bulkheads or partitions 13. Hopper slope sheets 14 funnel downwardly from partitions 13 to form bottom discharge openings 15 with hopper side sheets 16. Hatch covers 18 open into hoppers 12 for loading car 10.

Extending around the periphery of each opening 15 is an outwardly extending flange 20 as shown in FIGURES 2–7. Secured to flange 20 of each hopper 12 by suitable means, such as by welding, is a hopper outlet structure indicated generally at 22. Each hopper structure 22 is identical and has an upper peripheral flange 24 adapted to fit against flange 20. End outlet sheets 26 extend between and connect side outlet sheets 28 to form outlet structure 22. Outlet sheets 26 and 28 funnel downwardly to a generally rectangular opening 30. Forming three sides of a generally rectangular frame beneath opening 30 are bars 32 of a rectangular cross section. The remaining side of the rectangular frame is formed by channel 34 beneath one of the side sheets 28 and an angle 36 secured, such as by welding, to the inner face of channel 34.

An upper reinforcing angle 38 is secured, such as by welding, to the adjacent outlet slope sheet 28 and is spaced from channel 34 to form a gate slot 40 therebetween as shown in FIGURE 3. Mounted for sliding movement within slot 40 along the flat upper surface of channel 34 and bars 32 is a gate 42. A flange 44 (see FIGURES 4 and 8) on each end sheet 26 forms a side retaining guide strip for gate 42 as it moves along bars 32. Spaced end lugs 46 secured to side sheet 28 position gate 42 in the closed position thereof.

A pair of spaced arms 48 extend rearwardly from gate 42 as shown in FIGURE 4 and form bearing supports for a pinion shaft 50. A pinion 52 adjacent each end of shaft 50 has teeth engaging an associated rack 54. Racks 54 are secured, such as by welding, to channel members 56 which support gate 42 for movement. A cross brace 58 extends between the rear ends of channel members 56. A capstan 60 on each end of shaft 50 has suitable openings 62 therein to permit a handspike or the like to be inserted for rotating shaft 50 and pinions 52. Rotation of pinions 52 which are in engagement with racks 54 open and close gate 42.

Figure 7:
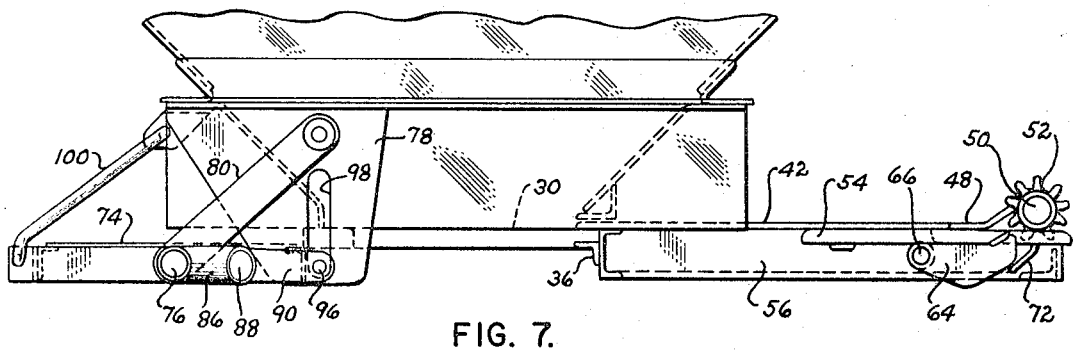
FIGURE 7 is a view similar to FIGURES 5 and 6 but showing the lower cover in fully opened stored position and releasably locked in such position.

To hold gate 42 in closed position as shown in FIGURES 2 and 3, a stop lever 64 is mounted on each end of a shaft 66 supported on channel members 56. Stop levers 64 engage shaft 50 in the closed position of gate 42 as shown in FIGURE 2. A suitable seal may pass through aligned openings in lugs 68 and 70 on respective lever 64 and channel 56 to seal the gate in closed position thereby to prevent undetected opening of gate 42. To permit opening of gate 42, stop levers 64 are swung against supports 72 on racks 54 as shown in FIGURE 7.

Figure 8:
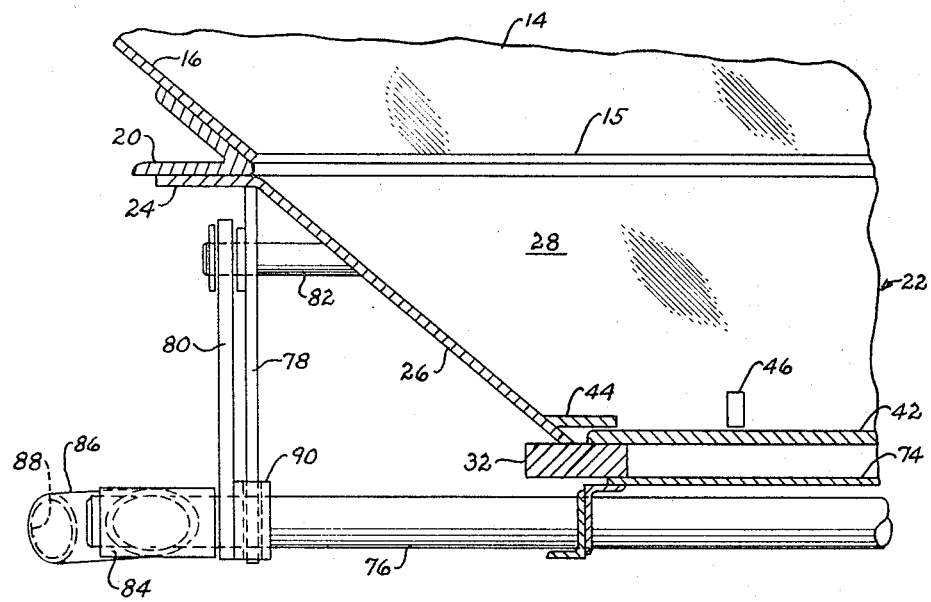
FIGURE 8 is an enlarged fragmentary sectional view taken generally along line 8—8 of FIGURE 2 and showing the end portion of the rod on which the lower cover is mounted.

Mounted beneath gate 42 and fitting against the rectangular frame formed by bars 32 and channel 34 is a bottom cover or plate 74 having downturned edges. Cover 74 is supported on a rod or shaft 76 which extends beyond each end of the cover. A hanger plate 78 is secured to each outlet end plate 26 and extends downwardly as shown in FIGURE 8. A hanger or link arm 80 adjacent each end of rod 76 is pivotally mounted at its upper end about pin 82 secured to the adjacent hanger plate 78 and end sheet 26. Rod 76 is pivotally carried by the other lower end of arm 80 for supporting cover 74 and rod 76.

Figure 5:
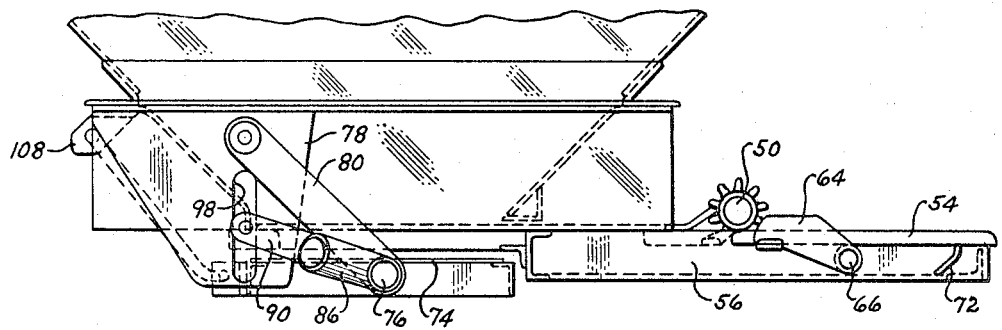
FIGURE 5 is a side elevation similar to FIGURE 2 but showing the position of the cover as it is initially opened and swung downwardly from the lower surface of the superjacent hopper structure.
Figure 6:
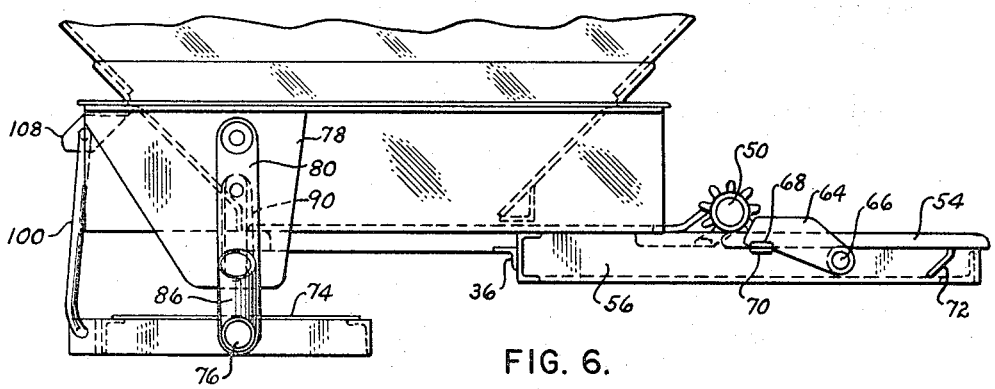
FIGURE 6 is a view similar to FIGURE 2 but showing the lower cover in its lowermost position as it is being moved to an open stored position from closed position.
Figure 9:
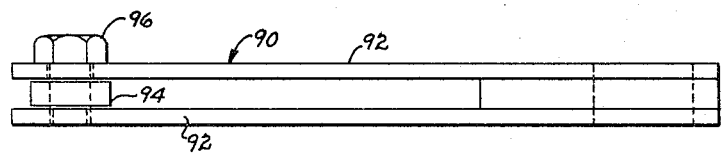
FIGURE 9 is a plan view of the link for releasably locking the cover in open and closed positions shown removed from the outlet structure.

Fixed to each end of rod 76 is a hub 84 having an outwardly projecting tubular end 86 with an opening 88 adapted to receive a handspike or the like for rotating rod 76 and swinging cover 74 between open and closed positions. Fixed to rod 76 adjacent each hub 84 is a link 90 bifurcated to form link arms 92 which fit on opposite sides of hanger plate 78 as shown in FIGURE 8. As shown in FIGURE 9, a roller 94 is mounted for rotation on pin 96 between link arms 92 and fits within slot 98 in hanger plate 78. Slot 98 extends in a generally vertical direction and roller 94 moves up and down in slot 98 as cover 74 moves between open and closed positions as shown in FIGURES 5–7.

To maintain the upper surface of cover 74 generally flat or level as it moves between open and closed positions, a bar 100 is pivotally connected at 102 adjacent its lower end to a lug 104 secured to cover 74. The upper end of bar 100 is pivotally connected at 106 to a downwardly extending projection 108 fixed to the underside of flange 24. Bar 100 forms with hanger arm 80 a parallelogram linkage and maintains the axes of cover 74 oriented during movement thereof upon rotation of shaft 76. Link 90 releasably locks cover 74 in closed position as shown in FIGURE 2 and in opened stored position as shown in FIGURE 7. When roller 94 is in its lowermost position of slot 98, the pivot formed at 96 is below the pivot formed by shaft 76 carrying cover 74. Thus, the weight of cover 74 acting through shaft 76 urges roller 94 downwardly against the end edge defining slot 98 thereby to releasably lock cover 74 in the closed position and in the opened stored position. Hanger arms 80 are freely mounted about shaft 76 and suspend cover 74 for movement between open and closed positions.

To open cover 74, a handspike or the like is inserted within tubular end 86 and shaft 76 is rotated in a clockwise direction viewing FIGURE 2. Since locking link 90 is fixed to shaft 76, the extending end of link 90 is first moved upwardly to the position of FIGURE 5 with roller 94 being swung above the level of rod 76 so that the weight of cover 74 urges arm 90 and roller 94 upwardly in slot 98 and cover 74 falls away from the bottom of outlet structure 22. Further rotation of hub 84 and shaft 76 moves cover 74 to the position of FIGURE 6. The position of cover 74 illustrated in FIGURE 7 shows the cover in fully open stored position with roller 94 in a lower end of slot 98 and being urged downwardly by the weight of cover 74. In this position, pinion shaft 50 may be rotated to open gate 42 as shown in FIGURE 7 thereby to permit a gravity discharge of material from railway car 10. After unloading, gate 42 is closed and then cover 74 is swung to closed position upon rotation of hub 84 and shaft 76 in a counterclockwise direction from its position of FIGURE 7.

Thus, railway hopper car 10 has a plurality of hopper outlet structures 22 arranged generally centrally of the width thereof, each hopper outlet structure having a discharge gate 42 and a lower cover 74 which may be operated from either side of the railway car. The cover is carried on a rod or shaft 76 which is suspended from hanger arms 80 and means are provided on shaft 76 for releasably holding or locking the cover in both the closed position of the cover and an open stored position thereof. Cover 74 is guided by a parallelogram linkage between open and closed positions so that the upper surface thereof remains generally level and tilting of cover 74 is prevented during movement thereof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A covered hopper railway car for transporting finely-divided material, comprising a hopper outlet structure having sides funneling downwardly to a bottom discharge opening positioned generally centrally of the width of the railway car, a gate movable between open and closed positions relative to the discharge opening for controlling discharge of lading from the hopper structure, a frame about said bottom discharge opening and extending downwardly therefrom beneath the movable gate when in closed position, an elongate bottom cover having its longitudinal axis extending transversely of the car and adapted to fit against the lower surface of said frame, said gate and cover being in generally horizontal planes and forming an enclosed area with the frame when the gate and cover are in closed position, means mounting the cover for movement between open and closed positions, said mounting means including a parallelogram linkage pivotally connected to the cover for supporting and holding the cover with its upper surface generally level throughout its movement between open and closed positions and restraining free pivoting of said cover thereby preventing tilting of the cover during movement between open and closed positions, a rod operatively connected to said cover and extending transversely of the car with end portions thereof extending beyond the ends of the cover, means on each end portion to permit rotation of the rod from each side of the railway car for opening and closing the cover, and toggle means for releasably securing the cover in open and closed positions including a link fixed adjacent one end to said rod for rotation therewith, the opposite end of said link upon rotation of said rod being moved with respect to the pivotal connections of the parallelogram linkage to the cover so that the rotational axis of said rod is urged through said link by the weight of the cover toward respective open and closed positions for releasably securing the cover thereat.

2. A railway covered hopper car as set forth in claim 1 wherein said opposite end of the link is mounted within a generally vertically extending slot carried by said hopper structure whereby upon rotation of said rod said link moves within said slot for guiding the cover between open and closed positions, said link engaging the bottom of said slot at open and closed positions of the cover.

3. A hopper outlet structure for a covered hopper railway car having sides funneling downwardly to a bottom discharge opening, a gate movable between open and closed positions relative to the discharge opening for regulating discharge of lading from the outlet structure, a frame extending downwardly from the bottom discharge opening beneath the movable gate when in closed position, a generally rectangular bottom cover having its longitudinal axis extending transversely of the railway car and adapted to fit against the lower surface of said frame, said gate and cover being in generally parallel horizontal planes and forming an enclosed area with the frame when the gate and cover are in closed position, a rod extending beneath the cover transversely of the car on which the cover is mounted for movement between closed and open positions relative to the bottom discharge opening and having end portions extending beyond the adjacent ends of the cover, said rod being mounted on said cover generally centrally of the width of said cover and being free to rotate relative to the cover, means mounting the cover for movement between open and closed positions, said mounting means including a parallelogram linkage pivotally connected to the cover for supporting and holding the cover with its upper surface generally level through its movement between open and closed positions and restraining free pivoting of said cover to thereby prevent tilting of the cover during movement between open and closed positions, means on each end portion to permit rotation of the rod from opposite sides of the railway car for opening and closing the cover, and toggle means for releasably securing the cover in open and closed positions including a link fixed adjacent one end to said rod for rotation therewith, the opposite end of said link upon rotation of said rod being moved with respect to the pivotal connections of the parallelogram linkage to the cover so that the rotational axis of said rod is urged through said link by the weight of the cover toward respective open and closed positions for releasably securing the cover thereat.

References Cited
UNITED STATES PATENTS

| | | | |
|---|---|---|---|
| 699,820 | 5/1902 | Sage | 105—284 X |
| 1,011,219 | 12/1911 | McKee | 105—284 X |
| 1,822,530 | 9/1931 | Kind | 214—44 |
| 2,079,392 | 5/1937 | Yost | 105—284 X |
| 2,080,845 | 5/1937 | Yost | 105—253 |
| 2,751,860 | 6/1956 | Dath | 105—282 |

ARTHUR L. LA POINT, *Primary Examiner.*

H. BELTRAN, *Assistant Examiner.*